UNITED STATES PATENT OFFICE.

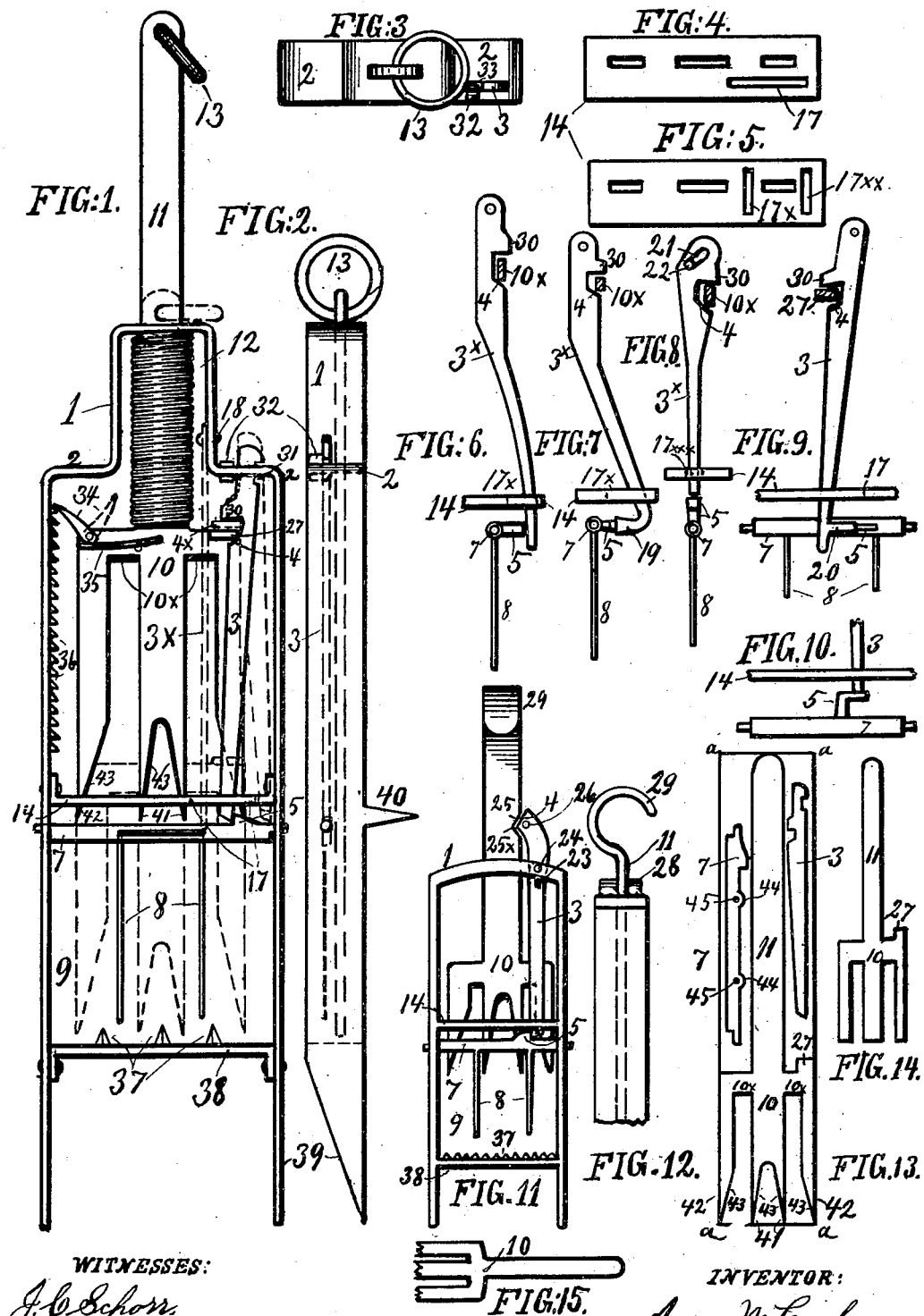

ANDREW M. CARLSEN, OF ST. PAUL, MINNESOTA.

ANIMAL-TRAP.

SPECIFICATION forming part of Letters Patent No. 674,551, dated May 21, 1901.

Application filed August 31, 1896. Serial No. 604,470. (No model.)

*To all whom it may concern:*

Be it known that I, ANDREW M. CARLSEN, a citizen of the United States, residing at St. Paul, in the county of Ramsey and State of Minnesota, have invented certain new and useful Improvements in Animal-Traps; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in animal-traps; and it consists in several further improvements in the trap covered by my United States Patent No. 558,038, issued April 14, 1896, the drawings and specifications of which contained so many attachments and features that several important improvements had to be left out and reserved for this application.

The objects of my invention are, first, to provide an animal-trap with a fork the rod of which shall be wide enough to act as a guide in the spring encircling the rod and driving the fork; second, to provide further means for taking the blow of the fork; third, to provide means for locking the fork so that the animal cannot lift it and escape; fourth, to provide the trap with prongs on the frame for coacting with the prongs of the fork in holding the animal; fifth, to make the trap self-setting, so that it will be set by simply raising the fork; sixth, to give the frame of the trap a form which will enable the tripping mechanism to work very easy; seventh, to provide a variety of modifications of the parts and their relative positions, which may be employed according to the size of the trap and the taste of the manufacturer without diverging from the vital elements and principles of my invention—viz., the double-acting trigger and a lever having an incline for holding up the fork; eighth, to so construct the trap that the small sizes of it may be manufactured very cheaply by stamping the parts out of wrought-iron or soft steel, which is much cheaper than malleable iron or even cast-iron. These and other minor objects I attain by the novel construction and arrangement of parts illustrated in the accompanying drawings, in which—

Figure 1 is a front elevation of my trap in its set position. Fig. 2 is an edge view of Fig. 1. Fig. 3 is a top end view of the trap. Fig. 4 is a top or plan view of the horizontal frame-bar in which the tines of the fork slide. Fig. 5 is a modification of Fig. 4. Figs. 6, 7, and 8 are end views of the frame-bar 14 and the trigger 7 8, showing modified manners in which the trigger may engage the tripping-lever. Fig. 9 is a front view of the trigger and lever 3, showing still a modified way of its connection with the tripping-lever. Fig. 10 is a side view of Fig. 8. Fig. 11 shows a modified way of holding up the fork by the incline of the tripping-lever. Fig. 12 shows a modified shape of the upper end of the fork. Figs. 13 and 14 illustrate the process of stamping out several of the parts of the trap from a small piece of iron in an economical manner. Fig. 15 shows a modification of the lower end of the fork.

Referring to the drawings by reference characters, 1 designates the frame, which is substantially of the shape shown, with its upper end reduced so as to form the angular shoulders 2, to one of which I secure pivotally the upper end of the tripping-lever 3, so as to reduce the distance from the pivoting-point to the inclined shoulder 4, which engages and holds up the fork, while the part of the lever 3 below the point of contact with the fork is thereby given more leverage, and thus bears with very little friction with its lower end against the projection 5 of the trigger 7 8, of which 7 is the shaft, journaled with both ends in the side bars of the frame, and 8 are the arms of the trigger.

9 is the gate or opening in the frame, in which the animal is caught in trying to pass through it from either side by the fork 10 11 sliding in the frame, and which for small traps I make in one single piece, preferably by stamping, but may cast them of malleable iron, steel, or gray iron, &c. The rod 11 of the fork I make flat, in order to avoid weight and weakening of the frame it passes through, but wide, so that it fills, guides, and holds in good position the pushing coil-spring 12, which encircles the rod and drives the fork into the animal and which without such guiding-rod would crumble over in various directions, and thus become unsightly and much reduced in force.

13 is a folding ring closely inserted in a hole in the upper end of the fork-rod and serves as a finger-hold in raising the fork and as a stop against the top of the frame when the fork goes down, thus preventing the fork from striking hard, or even striking at all, on the frame-bar 14. Such relieving of the frame-bar 14 from the blow of the fork is not only preferable, but quite necessary when said bar 14 is weakened by having the lever-guiding slot extending transversely over the bar, as indicated by $17^\times$ or $17^{\times\times}$, for guiding the lever 3 when it swings back and forth, as shown in the modifications, Figs. 6 and 7, and in the dotted lines $3^\times$ in Fig. 1, where it is pivoted at 18 to the inwardly-offset shoulder 2 of the frame and swings back and forth instead of from side to side in the trap and engages with its lower end the top or end of the projection 5 of the trigger-shaft 7, which projection is in that case turned sidewise, as shown in Fig. 6. This modification can be further improved by giving the lower end of the lever 3 a hook or foot shape, as 19, in Fig. 7, which will cause a more posititive release when the trigger is swung to the proper position for tripping than the uncertain slipping of the tooth 5 in Fig. 6, where the tripping-lever helps to throw the trigger out of the gate, and may when smoothed by wear or if lubricated by rain or other moisture do so before the animal gets in proper position to be caught by the fork. In Fig. 9 a similar foot-shaped end 20 of the lever 3 engages the tooth 5 upon the side of the trigger-shaft; but in this instance the lever 3 swings sidewise in a slot like 17 in Figs. 1 and 4.

In Fig. 8 it will be seen that the lever 3 may stand with its end upon the projection 5, which, as shown in Fig. 10, may be a kind of gooseneck shape, and releases the lever by passing either way from under it. The lever is in this instance provided with an obliquely-elongated hole or slot 21 in its upper end, by which it is suspended on the pin 22, secured in the upper part of the frame, the same as pin 18, and when its lower end is released it drops down with the fork as far as the length of the slot 21 permits, and the latter being oblique throws the incline 4 out of contact with the fork 10, which is thus released and driven by the spring 12 into the animal. In this modification the aperture 17 in the bar 14 is merely a hole $17^{\times\times\times}$ for the lever 3 to slide up and down in.

In Fig. 11 (where the frame is as in my former patent referred to) it will be seen that the lever 3 may have a slotted hole 23 playing on the pivot 24 and have the incline 4 near its very top above the frame and engages by it an incline 25, formed by a notch $25^\times$ in the rod 11 of the fork. This causes the lower end of the lever 3 to engage the projection 5 in opposite direction to that in Fig. 1. It is obvious that a pin, as 26, may in this instance take the place of the incline 4, since there is an incline 25 on the fork which may engage it. This would be an exchange of places of the pin and the incline as used in my former patent.

Whenever I turn the lever 3 in the direction shown by dotted lines $3^\times$ in Fig. 1 and indicated in the views Figs. 5, 6, 7, and 8, I turn the incline 4 not against the side of the pin or lug 27 upon the cross-head or junction of the fork, but against the front end of such projection, or I let it take hold directly of the cross-head or junction or uniting-bar $10^\times$ between the tines; but while I show these new and useful modifications or equivalents I prefer, as a rule, the form shown in Fig. 1, where the lever 3 swings sidewise in a slot, as 17 in Fig. 4, and engages the side of the projection 27 of the fork, because this form leaves the bar 14 strong enough to stand the blow of the fork, and I may thus dispense with the stopping-ring 13 or stopping-pin 28, (shown in Fig. 12,) and thus render the manufacturing cheaper by simply forming a hook, as 29 in Figs. 11 and 12, at the top end of the flat fork-rod 11.

It will be observed that the lever 3 is given a longitudinal play by means of the slot 23 in Fig. 11 or the notch 31 in Fig. 1, where the lever is held with said notch gaping over the frame, by a key 32 inserted at the opposite side of the lever in the hole 33, in which the lever is inserted, and thus pivotally suspended, as best shown in Figs. 1 and 3.

30 is a short side arm provided on the lever 3, near above its incline 4. The first function of this arm is to stop or limit the raising of the fork in setting the trap, and its second function is to coact with the play in the notch 31, so as to make the trap self-setting, for when the trap is held in a substantially perpendicular position and the fork is pulled upward the tooth 27 by taking hold of the end of the arm 30, as shown in dotted lines $4^\times$ in Fig. 1, lifts the lever 3 endwise up as far as the play in it will allow and then causes its lower end to swing sidewise over the top of the trigger-tooth 5, and as the fork is released the lower end of the lever 3 drops down and takes hold of the trigger-tooth 5, as shown in Fig. 1, and the trap is thus set by simply raising and releasing the fork. The self-setting takes place in a similar manner in the modification shown in Figs. 8, 10, and 11, while in the modification shown in Fig. 9 the self-setting takes place by the side swinging of the lever 3 without a longitudinal motion to it. The fork being raised holds the lever clear from the trigger-tooth, allowing the trigger to hang plumb down with its arms, and thus bring the tooth 5 opposite the toe 20 of the lever. In Figs. 6 and 7 self-setting may take place by raising the fork with the trap in a horizontal position and then tilt it to a perpendicular position and release the fork.

34 is a pawl or dog pivoted on the fork and held by the spring 35 in contact with the rack-bar 36, provided upon the frame. This pawl locks the fork so that the animal cannot raise it and escape from under it, and if the animal tries to lower its neck to get away from the fork the pawl takes a new hold still farther down and holds the animal so much tighter. The same spring 35 that holds the pawl in active position also holds it in the idle position (shown in dotted lines) while the fork is being raised in setting the trap.

37 represents teeth provided upon the frame-bar 38 for coacting with or assisting the fork in holding the animal. These teeth may be small and many, as shown in Fig. 11. The bottom prongs 39 of the frame I make slanting toward one side of the trap, so that they may get a good hold in the ground, even where the runway of the animal is cut almost at a right angle with the surface of the ground. Prongs, as 40, are claimed in plural in my former patent, above referred to; but I am aware that two or even one of them when sufficiently large and strong will answer the purpose of a greater number.

I am aware that the double-acting trigger and the lever 3, which are the vital elements of my invention, may one or both be applied to jaws and mostly any kind of catching mechanism adapted to catch an animal in the gate of a trap and that when forks are used as catching mechanism these may be made in an almost endless variety of styles from a two-pronged spear to a shovel-like contrivance with very small teeth at its front edge, as shown in Fig. 15. I am also aware that the said two elements may be still further modified, both as to shape and position, so I do not wish to confine the application of those new elements to certain constructions of the other parts of the trap. Still I wish to protect the style of fork shown in Figs. 1, 2, 11, and 13, where it will be seen that the rod 11 of the fork is broad and flat, so as to guide the mainspring encircling it, and the tines of the fork are also flat, and the middle one of them is very wide and bifurcated into two shorter tines or prongs 41, which, as well as the outer tines 42, have their inner edges 43 slanting toward the center of the fork, and the spaces between the tines are thus a kind of inverted-V shape from the points of the tines to as far up as they are likely to penetrate into the animal. By this construction of the fork the latter, though practically divided into three tines, so as to leave two spaces for the trigger-arms to swing in, has actually got four tines or prongs with about even distances between them, so that even the smallest size of animal that can spring or trip the trap will be caught by the tines or in the V-shaped spaces between the same, while if the fork is made with narrow tines, as in my former patent, the intervening spaces become so large and parallel that small animals are apt to get poorly caught and may get loose again. It is also observable that in the present style of the tines the incline of one tine is apt to throw the animal sidewise toward the next tine, so that it can hardly be caught by only one of them.

As for the manufacture of the trap by stamping the parts out of wrought-iron, I do not mean to bind myself to so doing; but when I do stamp the parts out I cut from a piece of sheet or band-iron or steel, like $a\ a\ a\ a$ in Fig. 13, the fork, and then the lever 3 and the trigger-shaft 7 out of the remnants of the same piece at both sides of the fork-rod 11, as shown. The fork when first blanked out looks like a small shovel, with the lip 27 (in Fig. 14) on it. In the next operation it is slotted for the trigger-arms, as in Fig. 14, and then its four inclines 43 are cut in one operation, leaving the points of the tines dead sharp. The tongue or lug 27 is then bent toward one side of the fork to form a hold for the tripping-lever, except when the latter is to engage the uniting-bar $10^\times$. The trigger-shaft is cut out with two small lips 44 at one edge of it. In or near these lips I punch two holes 45, in which I insert a wire staple, forming the trigger-arms 8. This is held tightly in the holes by having the lips 44 squeezed into the holes after insertion of the wire, so that the lips disappear, as can be seen in Fig. 1. The frame 1 is very cheaply cut, punched, and formed by proper dies from band-iron of the requisite dimension and riveted together, as shown in Fig. 1; but for some sizes of the trap I cast the frame from malleable iron, with or without the bar 14 in it, as the latter may be more cheaply made separate and inserted than to core all the holes through it. In some of the small traps I punch or cut by dies the entire trigger 7 8 in one single piece.

Having thus described my invention, what I claim, and desire to secure by Letters Patent, is—

1. In an animal-trap and mounted in a suitable frame, the combination with a spring-actuated fork, of a pivoted trigger having the projection 5, a pivotally-secured lever or bar engaging the said projection 5 of the trigger, and having the inclining shoulder 4, for holding up the fork, and the short side arm 30, engaging the fork to limit its raising, and to throw the lower end of the lever into a locking position with the trigger, substantially as shown and described.

2. In an animal-trap and mounted in a suitable frame, the combination with a spring-actuated fork, of a pivoted trigger having the projection 5, a pivotally-secured lever or bar engaging the said projection 5 of the trigger, and having the inclining shoulder 4, for holding up the fork, and the short side arm 30 engaging the fork to limit its raising, and to throw the lower end of the lever into a locking position with the trigger; said lever having a play in its point of fastening, allowing the fork when in contact with the arm 30, to lift the lever over the tooth or projection 5 of the trigger, substantially as and for the purpose set forth.

3. In an animal-trap, the spring-actuated fork having three tines, of which the outer ones have single points and the middle one is bifurcated into two points or prongs, substantially as and for the purpose set forth.

4. In an animal-trap, the combination with an elongated frame having a gate for the animal to enter from either side, of a spring-actuated fork sliding therein, a tripping lever pivotally suspended in the frame and provided with a side shoulder adapted to engage and hold the fork in its set position; a double-acting trigger consisting of a rock-shaft journaled with its ends in the sides of the frame, and having arms extending into the gate, and a cam or projection adapted to engage the free end of the tripping lever, so as to thereby hold the shoulder of the lever in contact with the fork, and release it when the trigger swings to either side, substantially as shown and described and for the purpose set forth.

5. In an animal-trap, the combination with an elongated frame having a gate for the animal to enter from either side, of a spring-actuated fork sliding therein, a pivoted lever having a side shoulder engaging the fork to hold it in its raised position, and a double-acting trigger provided with arms extending into the gate, and with a cam or projection engaging the lever to hold it in engagement with the fork; a spring-held pawl pivoted to the fork, and a rack provided upon one of the frame-bars for the pawl to engage, substantially as and for the purpose set forth.

6. In an animal-trap, the combination with a frame having a gate for the animal to enter into from either side, of a spring-actuated fork slidingly inserted in the frame, and adapted to spear the animal when in the gate, a dog, lever or rod pivotally secured in the frame and having a slanting shoulder supporting the fork when it is retracted; a double-acting trigger mounted to swing in the frame, and having arms extending into the gate, and a projection or cam engaging the dog or lever to hold it in locking contact with the fork, said trigger and dog or lever swinging in the same plane, or in planes parallel to each other, substantially as set forth.

7. In an animal-trap, the combination with a frame having a gate for the animal to enter into from either side, of a spring-actuated fork sliding in the frame and adapted to spear the animal when in the gate, a dog or tripping lever pivotally secured in the frame and having a slanting shoulder supporting the fork in its retracted position, a double-acting trigger pivotally mounted in the framework and having arms or pendants extending into the gate, and a projection or cam engaging the dog or tripping lever to hold its shoulder in locking contact with the fork; said tripping-lever and trigger swinging in the same plane, or in planes parallel to each other, and said dog or tripping lever having a lateral projection or toe at its point of contact with the cam or projection of the trigger, to insure tripping of the lever at the time the animal has pushed the trigger to such predetermined position as will bring the animal in position to be properly caught by the fork, substantially as set forth.

8. In an animal-trap, the combination with a frame having a gate for the animal to enter into from either side, of a spring-actuated fork or spear slidable in the frame and adapted to spear the animal when in the gate, a dog or tripping lever pivotally suspended in the frame and having an inclined shoulder or face engaging the fork to hold it retracted, a double-acting trigger pivotally mounted in the framework and having pendants or arms extending into the gate, and a cam or projection by which it holds the tripping lever in locking contact with the fork; said lever having a diagonal play in its point of fastening to the frame, so as to allow the fork to throw the lever into setting engagement with the cam on the trigger during the retractive motion of the fork and its engagement with the arm or shoulder 30 of the lever, substantially as and for the purpose set forth.

9. As an improved article of manufacture, an animal-trap of the class described, comprising in combination the frame adapted to be interposed in the path of the animal, the impaling-spear slidable therein, and its actuating-spring, the dog pivoted to said frame, and adapted to engage said spear to hold the same withdrawn, the trigger journaled in said frame adjacent the free end of the dog, and adapted to swing through the frame in either direction to release the dog and in a plane coincident with the line of movement of the dog, said trigger when in depending position engaging the dog and holding it in locking engagement with said spear.

10. As an improved article of manufacture, an animal-trap of the class described, comprising in combination the frame adapted to be interposed in the path of the animal, the impaling-spear slidable therein, its actuating-spring, the dog pivoted to said frame and adapted to engage the impaling-spear to hold it in retracted position, the trigger journaled in said frame adjacent the free end of the dog, and swinging in the same plane to and from the rear and forward sides of the trap, the projection upon said trigger normally engaging said dog, to hold it in locking engagement with the spear.

In testimony whereof I affix my signature in presence of two witnesses.

ANDREW M. CARLSEN.

Witnesses:
J. C. SCHORR,
F. G. SCHORR.